United States Patent
Nakajima

(10) Patent No.: US 7,742,080 B2
(45) Date of Patent: Jun. 22, 2010

(54) IMAGE PROCESSING APPARATUS, DIGITAL CAMERA, AND IMAGE PROCESSING METHOD FOR ATTACHING PROPER IMAGING CONDITIONS TO A CAPTURED IMAGE

(75) Inventor: Yasumasa Nakajima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1201 days.

(21) Appl. No.: 11/226,304

(22) Filed: Sep. 15, 2005

(65) Prior Publication Data

US 2006/0055785 A1    Mar. 16, 2006

(30) Foreign Application Priority Data

Sep. 15, 2004 (JP) .............................. 2004-267978
Sep. 2, 2005 (JP) .............................. 2005-254563

(51) Int. Cl.
*H04N 5/228* (2006.01)
(52) U.S. Cl. ............... 348/222.1; 348/231.3; 348/231.6
(58) Field of Classification Search ............... 348/222.1
See application file for complete search history.

(56) References Cited

U.S. PATENT DOCUMENTS

| | | | | |
|---|---|---|---|---|
| 6,301,440 | B1 * | 10/2001 | Bolle et al. | 396/128 |
| 7,098,946 | B1 * | 8/2006 | Koseki et al. | 348/229.1 |
| 7,379,213 | B2 * | 5/2008 | Koizumi | 358/3.27 |
| 7,471,312 | B2 | 12/2008 | Toyoda | |
| 2003/0063213 | A1 * | 4/2003 | Poplin | 348/362 |
| 2004/0036898 | A1 * | 2/2004 | Takahashi | 358/1.9 |
| 2004/0125211 | A1 * | 7/2004 | Ishida | 348/207.99 |
| 2004/0150726 | A1 * | 8/2004 | Gallagher | 348/222.1 |
| 2009/0073473 | A1 | 3/2009 | Toyoda | |

FOREIGN PATENT DOCUMENTS

| | | |
|---|---|---|
| JP | 11-261933 A | 9/1999 |
| JP | 2002-330388 A | 11/2002 |
| JP | 2003-189229 A | 7/2003 |
| JP | 2004-40559 A | 2/2004 |
| JP | 2004-96500 A | 3/2004 |
| JP | 2004-128809 A | 4/2004 |
| JP | 2004-247983 A | 9/2004 |

* cited by examiner

*Primary Examiner*—Jason Chan
*Assistant Examiner*—Cynthia Calderon
(74) *Attorney, Agent, or Firm*—Sughrue Mion, PLLC

(57) ABSTRACT

An image processing apparatus includes an access unit, a setting unit and an image generation unit. The access unit accesses RAW data representing a tone level of one channel for each pixel and attribute data attached to the RAW data. The setting unit sets generation condition to generate an image from the RAW data. The image generation unit generates an output image from the RAW data on the basis of the generation condition, attaches attaching the attribute data to the output image for an item of which generation condition matches the attribute data, and attaches the attribute data to the output image for an item of which generation condition does not match the attribute data.

11 Claims, 14 Drawing Sheets

(A)

| Imaging conditions | Set values |
|---|---|
| Focus position | 1m |
| Shutter speed | 1／60 |
| F-number | F2.8 |
| Scene mode | Auto |

Brightness correction (B)

| Imaging conditions | Set values |
|---|---|
| Focus position | 1m |
| Shutter speed | 1/60:X |
| F-number | F2.8:X |
| Scene mode | Auto |

IMAGE PROCESSING APPARATUS, DIGITAL CAMERA, AND IMAGE PROCESSING METHOD FOR ATTACHING PROPER IMAGING CONDITIONS TO A CAPTURED IMAGE

CROSS-REFERENCE TO RELATED APPLICATIONS

The entire disclosures of Japanese Patent Application Nos. 2004-267978 (filed on Sep. 15, 2004) and 2005-254563 (filed on Sep. 2, 2005), including specifications, drawings and abstracts, are incorporated by reference herein.

BACKGROUND OF THE INVENTION

1. Field of the Invention

The present invention relates to an image processing apparatus, a digital camera and an image processing method.

2. Background Art

There is known a digital camera in which RAW data generated when an image is picked up, and an image generated from the RAW data are stored in a storage medium (see Unexamined Japanese Patent Application No. 11-261933, for example). After picking up or capturing an image, the digital camera is capable of generating the image from the RAW data. Another system (a personal computer, for example), which is different from the system that generates the RAW data, is also capable of generating an image from the RAW data and correcting the image. In an environment where the image can be generated from the RAW data after image pickup, a user is allowed to obtain a desired image even after the image was picked up in improper imaging conditions.

It is a common practice that in the digital camera, RAW data and images are stored in a storage medium in a state that attribute data, such as shutter speed, f-number and resolution, are attached to the RAW data and the images. Accordingly, the user may set proper imaging conditions when he/she picks up an image in an environment similar to that where the image was picked up, by referring to the image and the attribute data attached thereto.

When an image that is generated in certain imaging conditions is rendered bright over the entire image, a shutter speed and an f-number attached to the original image do not match tone levels of the retouched output image. Accordingly, in a situation where the user picks up an image in the same environment as that where an image not retouched, or original image, was picked up, while expecting that the same image as the retouched image will be generated, by use of a digital camera that is set at a shutter speed and an f-number, which are attached to the original image, an image captured is not as expected.

SUMMARY OF THE INVENTION

Accordingly, an object of the present invention is to provide an image processing apparatus and method, which prevents the user from setting improper imaging conditions by referring to the attribute data attached to the image.

(1) To achieve the above object, there is provided an image processing apparatus comprising: an access unit for accessing RAW data representing a tone level of one channel for each pixel and attribute data attached to the RAW data; a setting unit for setting generation condition to generate an image from the RAW data; and an image generation unit for generating an output image from the RAW data on the basis of the generation condition, for attaching the attribute data to the output image for an item of which generation condition matches the attribute data, and for attaching invalid data to the output image for an item of which generation condition does not match the attribute data.

When the image processing apparatus generates an output image from the RAW data, for an item of which generation condition matches the attribute data attached to the RAW data, the attribute data is attached to the output image. Accordingly, the user can set imaging condition by referring to the attribute data attached to the image. When the image processing apparatus generates an output image from the RAW data, for an item of which generation condition does not match the attribute data attached to the RAW data, the invalid data is attached to the output image. Accordingly, there is no chance that the user makes such a mistake that he/she sets improper imaging condition by referring to the attribute data attached to the image.

(2) The image processing apparatus further may include a display unit for displaying a display image generated from the RAW data on a screen. The setting unit may accept a request of setting the generation condition after the display image is displayed on the screen and may set the generation condition in accordance with the setting request.

The image processing apparatus accepts a request of setting the generation condition after the display image is displayed on the screen. Accordingly, the user properly judges generation condition from the display image, and can set proper generation condition to the image processing apparatus. Specifically, when the display image is blurred, the user may set the generation condition to increase a sharpness of the image.

(3) When the access unit is allowed to access the RAW data corresponding to the display image, the display unit may display on the screen a guide indication indicating that the output image can be generated from the RAW data corresponding to the display image.

(4) The guide indication may be an object of operation, which is used by a user for requesting a process of generating the output image from the RAW data corresponding to the display image.

Thus, when the image processing apparatus is allowed to access the RAW data corresponding to the display image, the guide indication, which is an object of operation, which is used by a user for requesting a process of generating the output image from the RAW data corresponding to the display image, is displayed on the screen. This feature increases the usability of the apparatus.

(5) According to another aspect of the invention, there is provided an image processing apparatus comprising: an access unit for accessing an original image and attribute data attached to the original image; a setting unit for setting retouch condition for retouching the original image; and a retouching unit for retouching the original image on the basis of the retouch condition to generate an output image, for attaching the attribute data to the output image for an item of which retouch condition matches the attribute data, and for attaching the attribute data to the output image for an item of which retouch condition does not match the attribute data.

When the image processing apparatus retouches the original image, the attribute data is attached to the output image for an item of which retouch condition matches the attribute data. Accordingly, the user can set imaging condition by referring to the attribute data attached to the output image. When the image processing apparatus retouches the original image, the attribute data is attached to the output image for an item of which retouch condition does not match the attribute data. Accordingly, there is no chance that the user makes such a mistake that he/she sets improper imaging condition by referring to the attribute data attached to the image.

(6) According to yet another aspect of the invention, there is provided an processing method comprising the steps of: accessing RAW data representing a tone level of one channel for each pixel and attribute data attached to the RAW data; setting generation condition to generate an image from the RAW data; and generating an output image from the RAW data on the basis of the generation condition, attaching the attribute data to the output image for an item of which generation condition matches the attribute data, and attaching the attribute data to the output image for an item of which generation condition does not match the attribute data.

(7) According to an additional aspect of the invention, there is provided an image processing method comprising the steps of: accessing an original image and attribute data attached to the original image; setting retouch conditions for retouching the original image; and retouching the original image on the basis of the retouch condition to generate an output image, attaching the attribute data to the output image for an item of which retouch condition matches the attribute data, and attaching the attribute data to the output image for an item of which retouch condition does not match the attribute data.

The functions of the units involved in the invention can be realized by use of hardware resources of which schemes per se specify the functions, hardware resources in which the functions are specified by programs, and proper combinations of them. It is noted that the functions of those units are not limited to those realized by use of hardware resources physically separated one another.

BRIEF DESCRIPTION OF THE DRAWINGS

The drawings attached to the specification diagrammatically depict embodiments implementing the technical idea of the present invention in simplified forms. Many components and the details of the embodiments, which will readily be understood to those persons skilled in the art, will be omitted to such a level as not to make the invention unclear.

BEST MODES FOR CARRYING OUT THE INVENTION

Figure 1:
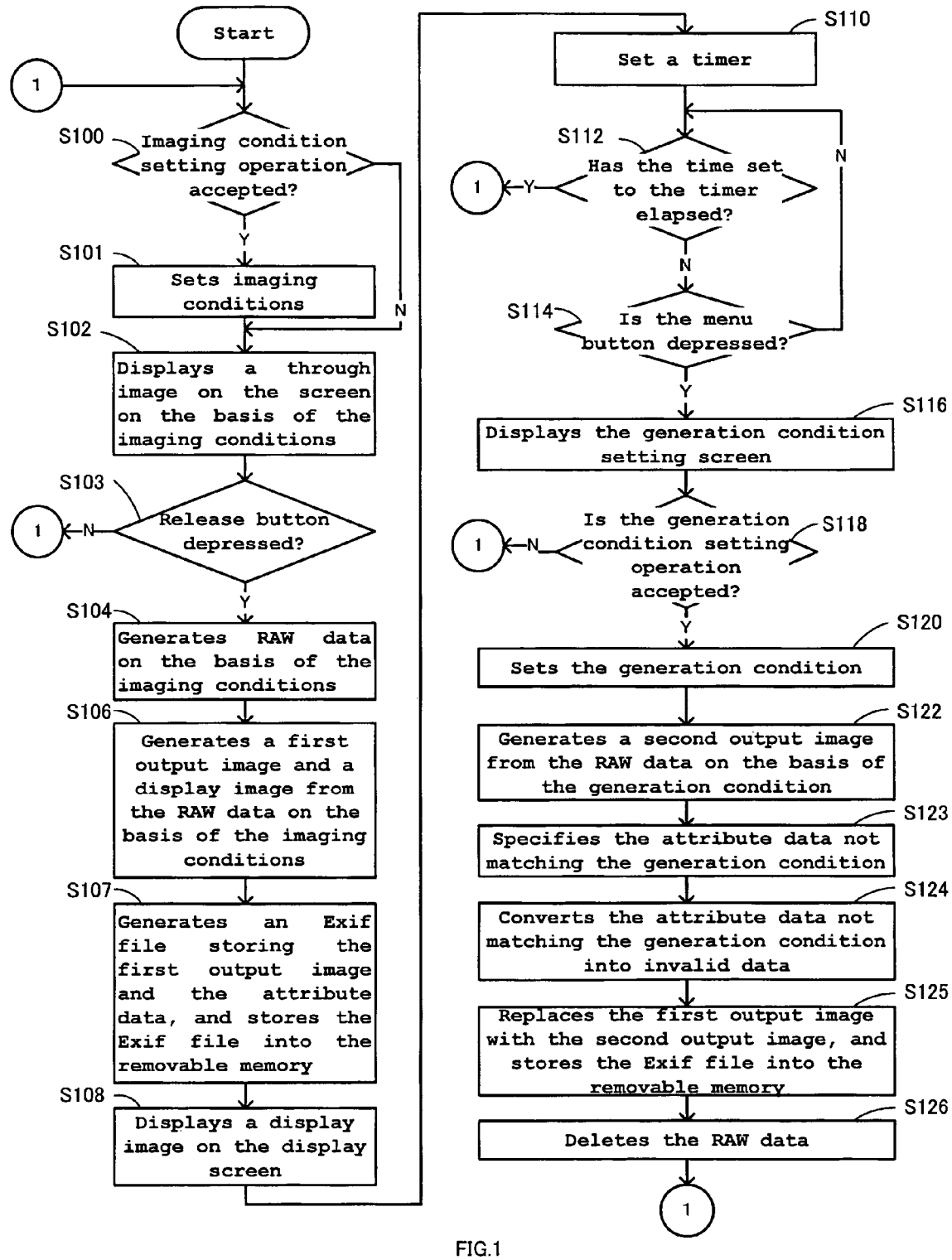
FIG. 1 is a flow chart according to a first embodiment of the present invention.

Best modes for carrying out the present invention will be described in detail using some embodiments with reference to the accompanying drawings. In the description to be given hereunder, like reference numerals will be used for designating like or equivalent elements, parts and portions. Further, duplicated explanations will be omitted for simplicity. While embodiments of the invention, which are believed to be preferred, will be described in detail, it should be understood that the invention is not limited to those embodiments, but may be modified, altered and changed within the true spirit and scope as defined by the appended claims.

First Embodiment

Figure 2:
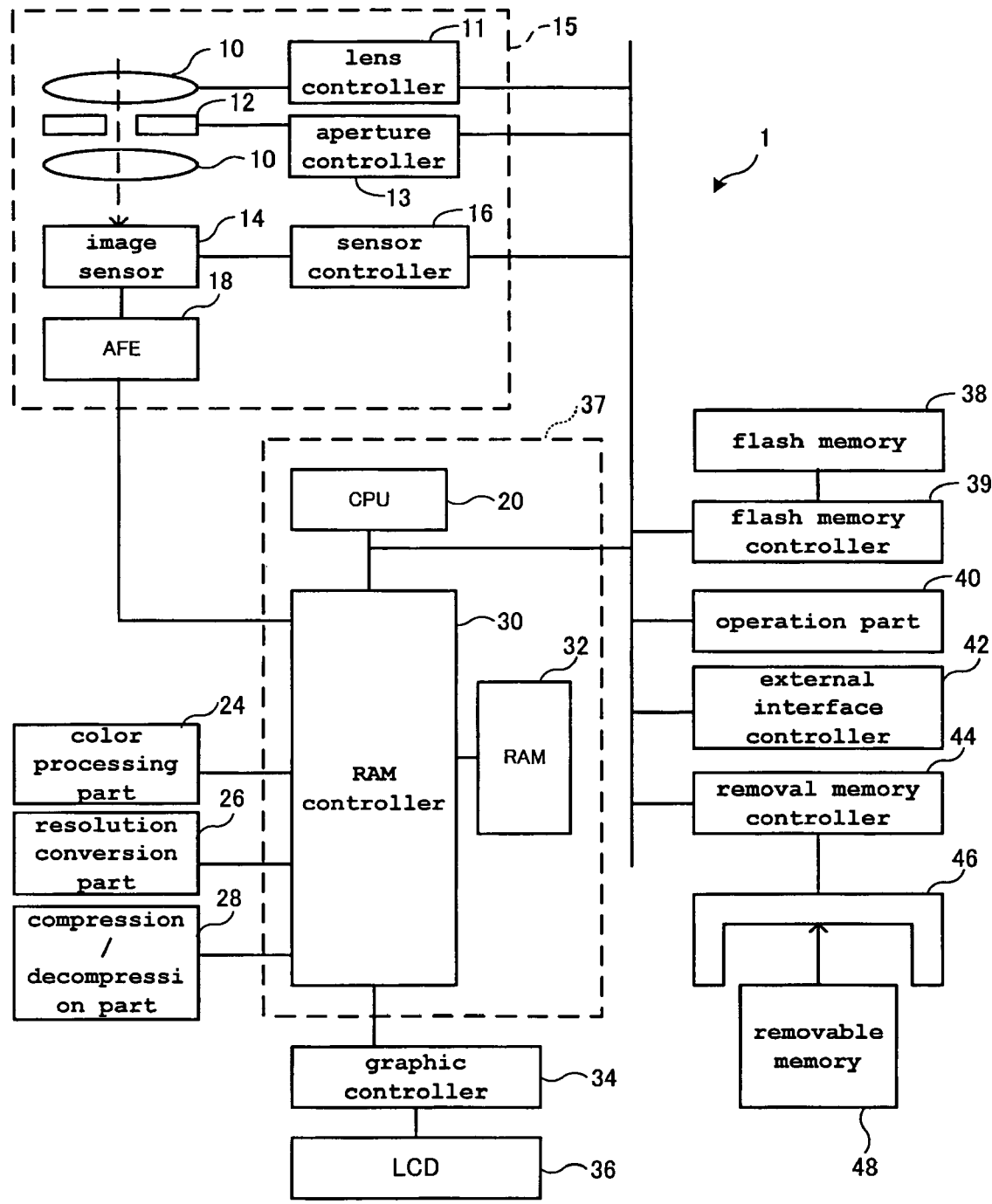
FIG. 2 is a block diagram according to the first embodiment of the present invention.
Figure 3:
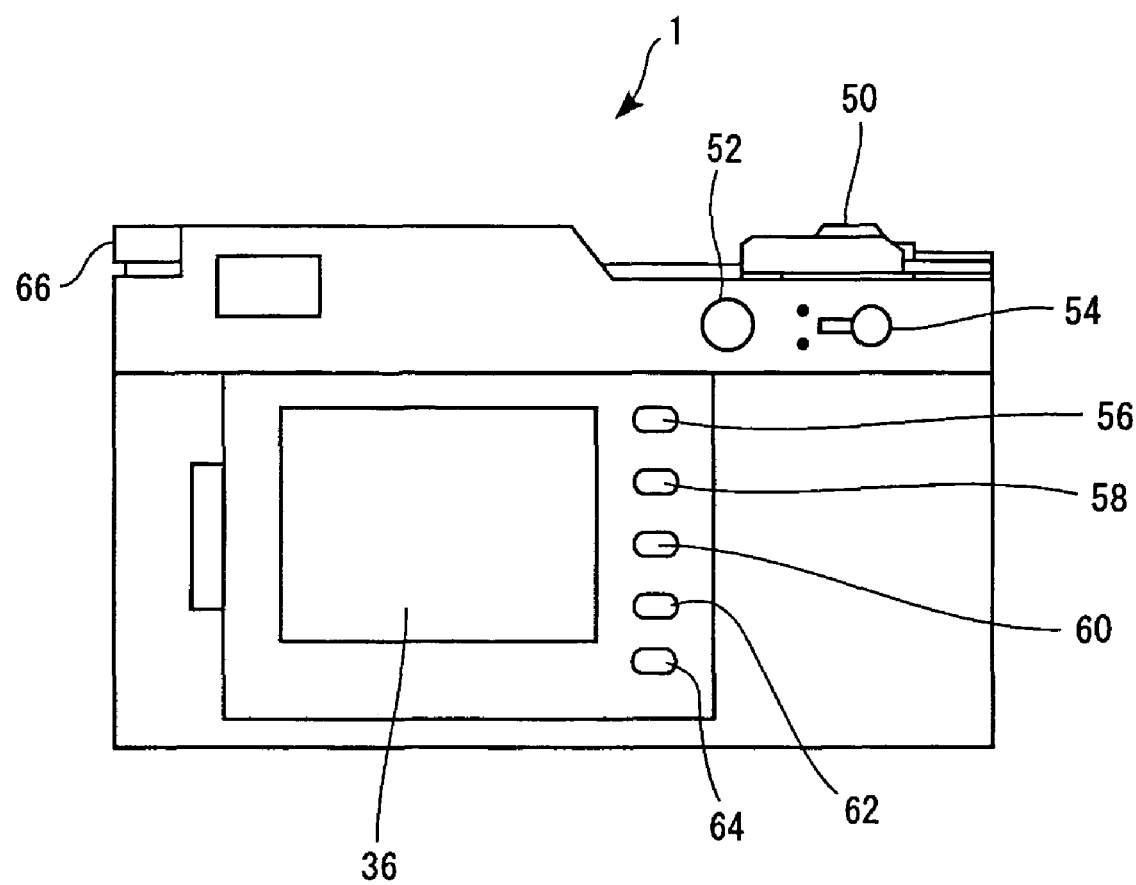
FIG. 3 is a rear side view according to the first embodiment of the present invention.

FIG. 2 is a block diagram showing a digital still camera (DSC) 1 as one form of an image processing apparatus which is a first embodiment of the present invention. FIG. 3 is a view showing a rear side of the digital still camera.

An image sensor 14 is a color image pickup element containing opto-electric transducing elements discretely and two-dimensionally arrayed, and charge transfer elements such as charge-coupled devices. Specifically, it may be a so-called CCD or CMOS color image sensor. The image sensor 14 outputs an electrical signal which depends on a tone level of an optical image formed on a light receiving surface through a lens 10 and an aperture 12. The image sensor 14 outputs an electrical signal representative of a tone level of one of RGB channels for each pixel since it includes a color filter with a Bayer arrangement for each opto-electric transducing element. The lens 10 is driven under control of a lens controller 11 to reciprocatively move in the optical axial direction. The aperture 12 is driven under control of an aperture controller 13 to adjust an amount of light incident on the image sensor 14. A time taken for storing charge into the image sensor 14 may be controlled mechanically by use of a mechanical shutter or electrically by turning on and off a gate signal to the image sensor 14. A sensor controller 16 outputs pulse signals, such as gate signals and shift signals, to the image sensor 14 at predetermined timings thereby to drive the image sensor 14.

An analog front end (AFE) 18 A/D converts an analog signal, which is output from the image sensor 14, into RAW data. Here, the "RAW data" roughly means data that is obtained by simply digitizing the analog signal from the image pickup element. The RAW data represents a tone level of one of RGB channels for each pixel. Accordingly, the RAW data that is directly applied to the display device causes the display device to display nothing. The RAW data may be data having undergone part of the tone level conversion, which is ordinarily applied at the time of image generation, such as exposure correction and white balance correction. The RAW data may also be data having undergone gamma correction or data not having undergone the same. RAW data output from the AFE 18 is stored into a RAM 32 under control of a RAM controller 30.

The lens 10, the aperture 12, the image sensor 14, the lens controller 11, the aperture controller 13, the analog front end 18, and the analog front end 18, which are described above, are components making up the image pickup portion 15.

A color processing part 24 as an image generation unit cooperates with a controller part 37 to apply an image generation process to the RAW data that is output from the analog front end 18 and stored in the RAM 32, in imaging conditions or generation conditions. Here, the "imaging conditions" include focus position, shutter speed, f-number, scene mode, white balance mode, resolution, data compression rate, etc. Specifically, the color processing part 24 generates an output color image from the RAW data on the basis of, for example, a white balance mode as an imaging condition. The "generation conditions" means image processing conditions for generating another output color image from the RAW data from which an output color image was already generated. An output color image that is first generated from the RAW data on the basis of the imaging condition is referred to as a "first output image" hereunder. An output color image that is generated from the RAW data on the basis of the generation conditions is referred to as a "second output image". The "image generation process" means a process for generating a color image having tone levels of RGB three channels for each pixel in a manner that a tone level of each pixel of the RAW data that corresponds to a stored charge of each opto-electric transducing element is interpolated using the tone levels of the adjacent pixels.

In the image generation process, it is possible to carry out an image retouching process with various kinds of density conversions, such as sharpness correction, brightness correction, contrast correction, white balance correction, and color balance correction, and the spatial information conversion. In a case where an image that is blurred by, for example, camera-shake at the time of image pickup is generated intermediately, if the sharpness correction is applied to the image intermediately generated, the resultant image is a sharp image. If the sharpness correction is applied to an image of a scene, the image can be corrected to be a sharp image giving an impression being focused over a wide range. When the brightness correction and the contrast adjustment are applied to an image of overexposure or underexposure or RAW data, the image can be corrected to be substantially an image of optimal exposure. The white balance correction to be applied to the image or RAW data is a process to adjust RGB gains in accordance with an illuminating environment of a subject to be picked up. If the color balance correction is applied to an image of a portrait or flower, a flesh color of the image can be corrected to be a beautiful color or a flower petal can be corrected to have a vivid color.

A resolution conversion part 26 as an image generation unit converts a resolution of a color image to a predetermined resolution. Specifically, the resolution conversion part 26 converts a color image so as to have a resolution set as the imaging condition or the generation condition or to have a resolution corresponding to a screen size of an LCD 36. A color image having a resolution, which corresponds to a screen size of an LCD 36, will be referred to as a "display image" hereunder.

A compression/decompression part 28 as an image generation unit compresses a color image or decompresses a compressed color image. The compression method may be a reversible compression method or a non-reversible compression method. More specifically, the compression method may be a JPEG method or a JPEG 2000, which is constructed by combining DCT, wavelet conversion, quantization, Huffman encoding, run-length encoding and the like. In the DSC 1, a color image may be stored into a removable memory 48 as a storage medium in a state that it is not compressed.

The functions of the color processing part 24, the resolution conversion part 26 and the compression/decompression part 28, which have been described, may be realized by using a dedicated circuit, for example, an ASIC. Those functions may also be realized through execution of a specific program by the controller part 37.

Figure 4:
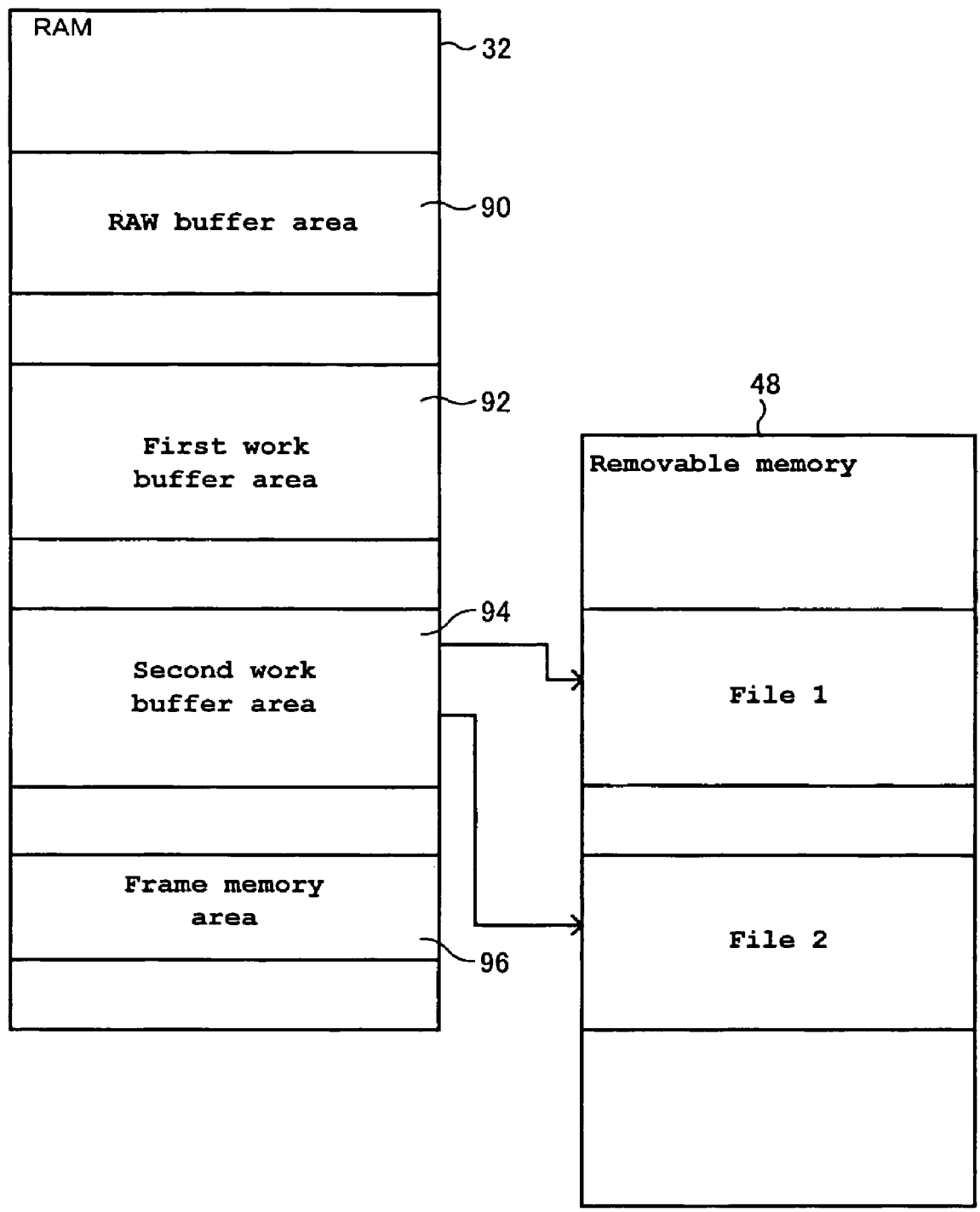
FIG. 4 is a diagram showing a data structure according to the first embodiment of the present invention.

A graphic controller 34 as a display unit is provided with, for example, a display control circuit with a composing function. The graphic controller displays only a display image, which is stored in a frame memory area 96 (FIG. 4) of the RAM 32, on the screen of the LCD 36, or displays a display image and a menu in an overlaying fashion on the screen.

An operation part 40 as a setting unit includes a release button 50, and various types of push buttons 52, 56, 58, 60, 62, and 64, a lever 54, and a jog dial 66, which are provided for menu operations.

An external interface controller 42 communicatively interconnects the DSC 1 and an external system (not shown), such as a personal computer (PC). The external interface controller 42 may also function as an access unit.

A removal memory controller 44 as an access unit is an input/output mechanism for transferring data that is stored in the RAM 32 to the removable memory 48 connected to a card connector 46, and transfers the data stored in the removable memory 48 to the RAM 32.

A flash memory controller 39 transfers the data stored the flash memory 38 to the RAM 32. The flash memory 38 is a non-volatile memory, which stores an image processing program to be executed by the CPU 20. An image processing program necessary for the operation of the DSC 1, and various kinds of data may be stored into the flash memory 38 in a manner that the program and data are downloaded from a given server via a network or read out of the removable memory 48. The flash memory controller 39 may also function as an access unit.

The controller part 37 serves as the access unit, the setting unit, the image generation unit and the display unit, and includes the CPU 20, the RAM 32, and the RAM controller 30. The CPU 20 controls the related portions of the DSC 1 by executing the image processing program that is stored in the flash memory 38. The image processing program may be stored into the flash memory 38 by means of the removable memory, a communication network or the like. The RAM controller 30 controls data transfer between the RAM 32 and system components including the analog front end 18, the color processing part 24, the resolution conversion part 26, the compression/decompression part 28, the RAM controller 30, the graphic controller 34, the removal memory controller 44, and the flash memory controller 39.

FIG. 1 is a flow chart showing an image processing flow in the DSC 1. A process shown in FIG. 1 starts to run when the DSC 1 shifts its operation mode to an image pickup mode, and its execution is repeated till the image pickup mode of the DSC 1 is shifted from the image pickup mode to another operation mode, for example, a reproducing mode.

In steps S100 and S101, the controller part 37 sets imaging conditions in accordance with setting operations by the user. It may be designed that the controller part 37 automatically sets the imaging conditions in the half-shutter mode. The imaging conditions may be focus position, shutter speed, f-number, scene mode, white balance mode, resolution, data compression rate, etc. The white balance mode is a condition which allows the controller part 37 to perform a white balance correction in cooperation with the color processing part 24. The focus position, the shutter speed, the f-number, and the scene mode are conditions for controlling the lens controller 11, the aperture controller 13 and the like. More exactly, the aperture controller 13 opens the aperture when the scene mode is a portrait image pickup mode, and closes the aperture when it is a scene image pickup mode. The shutter speed is a condition for controlling a mechanical shutter or an electrical shutter. The resolution is a condition allowing the controller part 37 to perform a resolution conversion in cooperation with the resolution conversion part 26. The data compression rate is a condition allowing the controller part 37 to compress data in cooperation with the compression/decompression part 28.

In steps S102 and S103, the controller part 37 displays a through image on the screen of the LCD 36 on the basis of the imaging conditions until the release button 50 is depressed. The "through image" means a series of motion images that are obtained by picking up a subject to be formed on the image sensor 14 at fixed time intervals.

When the release button 50 is depressed, the controller part 37 cooperates with the image pickup portion 15 to generate RAW data on the basis of the conditions (step S104). The RAW data generated is stored into an RAW buffer area 90 (FIG. 4) of the RAM 32.

In a step S106, the controller part cooperates with the color processing part 24, the resolution conversion part 26 and the compression/decompression part 28 to generate a color image as a first output image from the RAW data on the basis of the imaging conditions, and to generate a color image as a display image based on a screen size of the LCD 36. The display image generated is stored into the frame memory area 96 of the RAM 32. The first output image is stored into a first work buffer area 92 or a second work buffer area 94.

Figure 5:
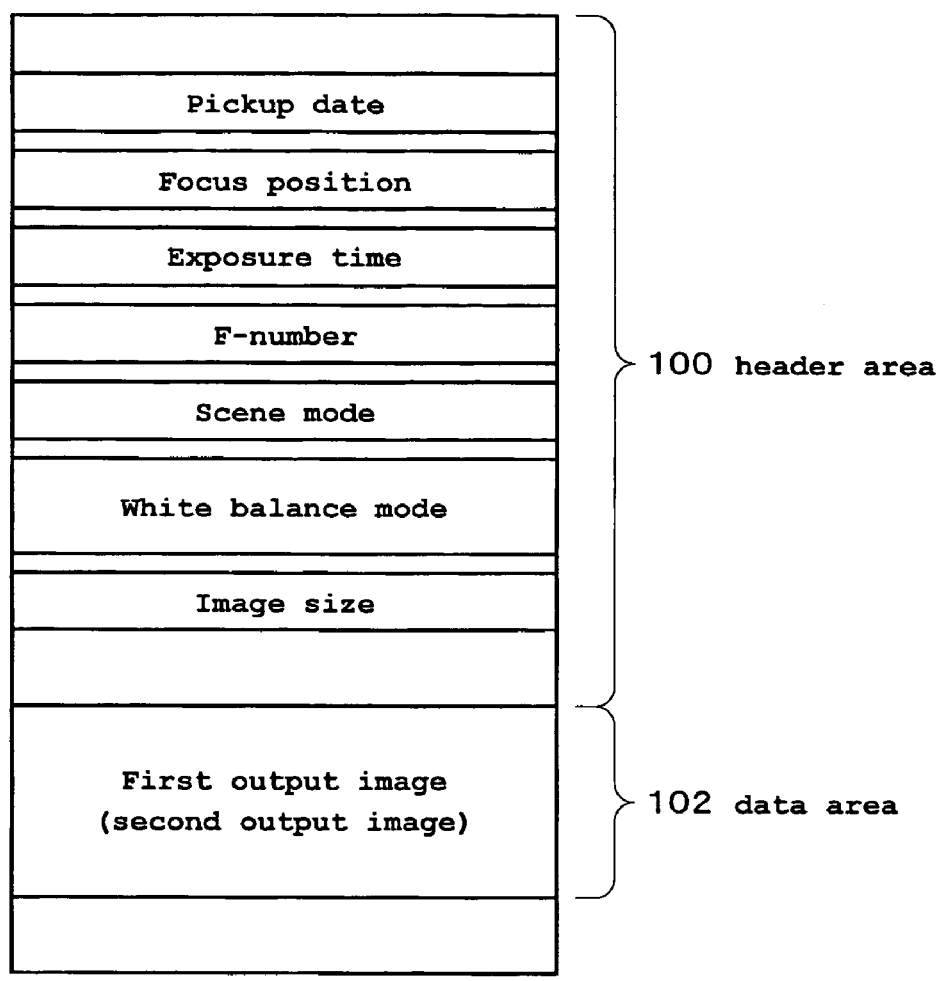
FIG. 5 is a view showing a file structure according to the first embodiment of the present invention.

In a step S107, the controller part 37 generates a file of a predetermined format that contains the first output image, the imaging conditions, image pickup date and the like, and stores the generated file into the removable memory 48. At this time, the first work buffer area 92 and second work buffer area 94 of the RAM 32 are used. Specifically, for example, a color image expressed in the RGB color space is stored into the first work buffer area 92. A color image whose color space has been converted from the RGB space to another color space, for example, YCbCr, is stored into the second work buffer area 94. The file of a predetermined format is a file of the Exif (exchangeable image file format) type. The color image as the first output image is stored into a data area 102 of the Exif file. The attribute data is stored as header information into a header area 100 of the Exif file (FIG. 5). It is satisfactory that the attribute data is stored into the removable memory 48 in a state that it is associated with the color image as the first output image. Its storing method is not limited to the method which stores the data into one file. Specifically, the controller part 37 stores the first output image, the attribute data, and a table for associating the first output image with the attribute data into files being different from each other, and stores those files into the removable memory 48.

Figure 6:
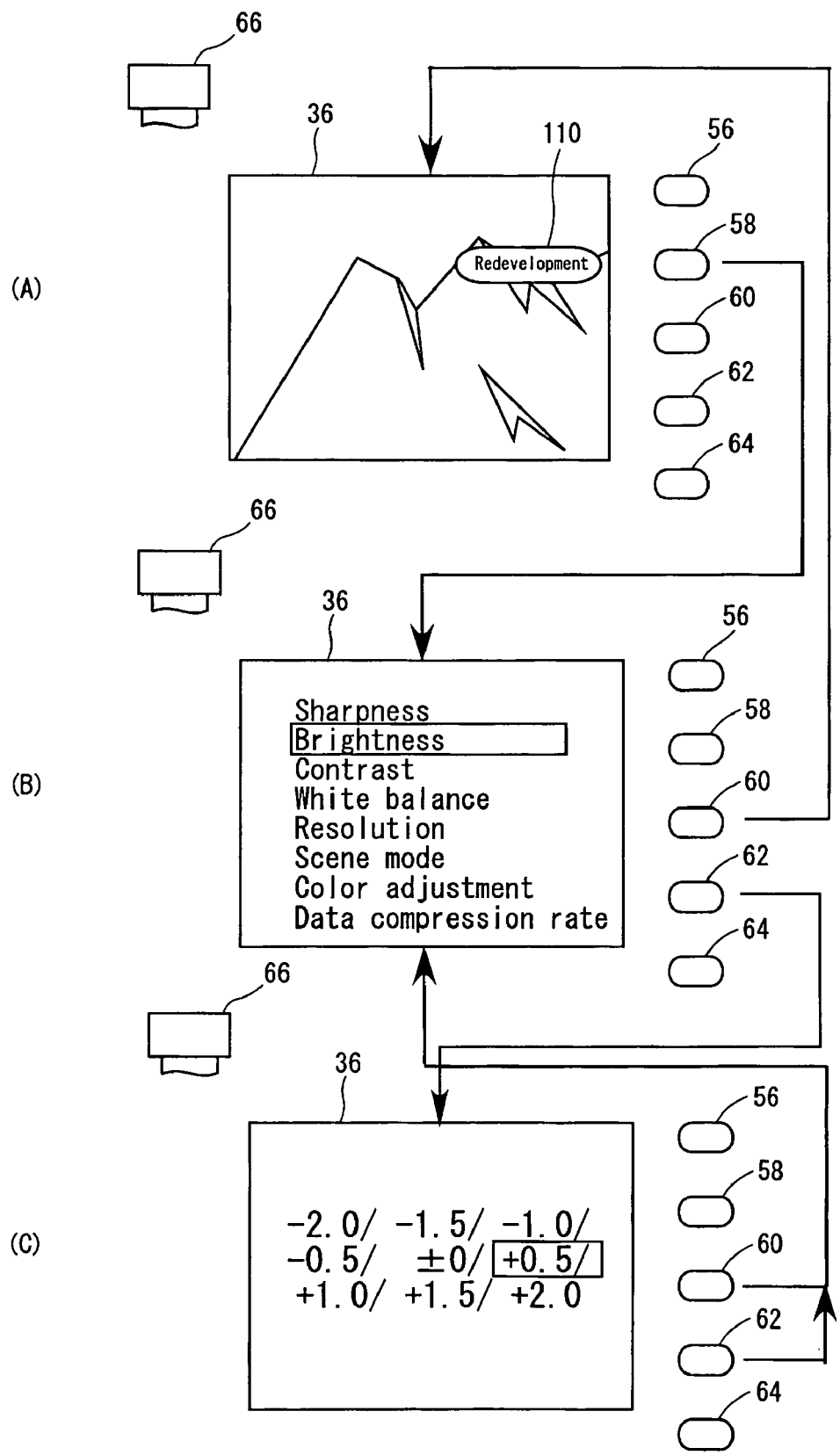
FIG. 6 is a diagram showing a screen transition according to the first embodiment of the present invention.

In a step S108, the controller part 37 displays a display image on the screen of the LCD 36. Exactly, for example, the controller part 37 cooperates with the graphic controller 34 to display a display image that is stored in the frame memory area 96 on the screen of the LCD 36. At this time, as shown in FIG. 6(A), the controller part 37 displays a guide indication 110 which guides that the controller part accepts the setting of generation conditions through a predetermined button operation. The user may check the display image on the screen of the LCD 36 before he sets the generation conditions. This ensures proper setting of the generation conditions by the user.

In steps S110, S112 and S114, the controller part 37 sets a timer at a predetermined time, and till the time set to the timer has elapsed, the controller part waits for depression of a button, for example, the menu button 58, that is displayed in the guide indication 110. During this time of period, when the push button 58 is depressed, the controller part 37 advances to a step S116. When it is not depressed, the controller part returns to the step S100. The guide indication 110 may be considered to be an object, i.e., an icon, used for the user to request a process of generating anew a color image from the RAW data.

In a step S116, the controller part 37 displays a generation-condition setting display window, which is for accepting the generation-condition setting operation, on the screen of the LCD 36. The generation conditions are for executing image data processing processes, such as sharpness correction, brightness correction, contrast correction, contrast correction, white balance correction, resolution conversion, scene mode correction, color balance correction, and data compression, and include a plurality of items corresponding to those processes. The controller part 37 may cause the user to set those items of the generation conditions by use of a menu having a hierarchical structure or a menu of monohierarchy. The menu having a hierarchical structure may be as shown in FIG. 6(B) or 6(C).

In steps S118 and S120, the controller part 37 waits for the generation condition to be set, and when the generation condition is set, the controller part sets the generation condition according to the setting operations. If the generation condition is not set, the controller part 37 returns to the process of the step S100. The generation condition setting operations are accepted in the following way, for example. In a state that a screen shown in FIG. 6(B) is displayed, the user turns the jog dial 66 to select any of sharpness, brightness, contrast, white balance, resolution, scene mode, color adjustment and data compression. In a state that the user selects one of the items, the user depresses a predetermined button, for example, the determining button 62 to call a menu shown in FIG. 6(C). The user selects any of items by tuning the jog dial 66 in a state that the screen shown in FIG. 6(C) is displayed. In a state that the user selects any of the items, the user depresses a predetermined button, for example, the determining button 62. In turn, the controller part 37 sets a—generation condition associated with the selected item to thereby display the screen shown in FIG. 6(B) again. In this stage, the final generation condition based on the RAW data is not yet set, but a parameter for setting the final generation condition is set. In a state that the screen shown in FIG. 6(C) is displayed, the user turns the cancel button 60, for example. In turn, the controller part 37 displays again the screen shown in FIG. 6(B) without setting the generation condition. In a state that the screen shown in FIG. 6(B) is displayed, the user turns a given button, for example, the function button 64. Upon depression of the button, the controller part 37 advances to the process of a step S122. Incidentally, the generation-condition setting operation will trigger the deleting of the RAW data in the subsequent process.

In the step S122, the controller part 37 cooperates with the color processing part 24, the resolution conversion part 26 and the compression/decompression part 28, and generates a color image as a second output image from the RAW data on the basis of the generation condition.

At this time, the first work buffer area 92 and the second work buffer area 94 in the RAM 32 are used. Specifically, for example, the color image expressed in an RGB color space is stored into the first work buffer area 92. A color image whose color space has been converted from the RGB space to another color space, for example, YCbCr, is stored into the second work buffer area 94. The color image as the second output image is stored into the first work buffer area 92 or the second work buffer area 94 in the RAM 32.

It is allowed that the controller part 37 displays on the screen of the LCD 36 a display image that is generated from the RAW data on the basis of the generation conditions, and it accepts, on the screen, the redoing of the setting of the generation conditions and the operation for checking the details of the generation condition setting. With provision of such functions, it is allowed that the user repeats the generation-condition setting operation till a satisfactory image quality is produced. As a result, the second output image can be produced from the RAW data on the basis of the optimum generation conditions.

Figure 7:
FIG. 7 is a model diagram according to the first embodiment of the present invention.

In a step S123, the controller part 37 cooperates with the removal memory controller 44 to access a file storing the color image as the first image, and specify attribute data that does not match the generation condition. Specifically, the controller part 37 specifies the attribute data that does not match the generation condition by referring to a table 103 (FIG. 7) describing relationships between the generation conditions and the attribute data not matching the generation conditions. This table is stored in the flash memory 38, for example. For example, where the generation condition for correcting a brightness of the image is set, the controller part 37 specifies the attribute data of the shutter speed and the aperture as attribute data that does not match the generation condition. The relationships between the generation conditions and the attribute data not matching the generation conditions may be designed in accordance with the specifications of the DSC 1. The controller part 37 may specify the attribute data of the aperture and the shutter speed as the attribute data not matching the generation condition, for the generation condition to correct the scene mode. For the generation condition for the color adjustment, the attribute data of the aperture and the shutter speed may be specified as the attribute data not matching the generation condition.

Figure 8:
FIG. 8 is a model diagram according to the first embodiment of the present invention.

In a step S124, the controller part 37 converts the attribute data not matching the generation condition to mismatching data. Specifically, for example, when the generation condition for the brightness correction has been set as shown in FIG. 8, the controller part converts the attribute data of the shutter speed (e.g. "1/60s") and the f-number (e.g. "F2.8") into invalid data. The invalid data (mismatching data) may be combination of the original attribute data and data indicating that the original data is invalid ("1/60s: x" for the shutter speed, for example).

In a step S125, the controller part 37 cooperates with the removal memory controller 44 to convert a color image as a first output image into another color image as a second output image, and stores a file storing the color image as the second output image into the removable memory 48.

In a step S126, the controller part 37 deletes the RAW data that is stored in the RAW buffer area 90 of the RAM 32. It is allowed that before the RAW data is deleted, the controller part 37 displays the color image as the second output image generated on the basis of the generation condition on the screen of the LCD 36, and it accepts, on the screen, the redoing of the setting of the generation conditions and the operation for checking the details of the generation-condition setting. With provision of such functions, it is allowed that the user repeats the generation-condition setting operation till a satisfactory image quality is produced. As a result, the second output image can be produced from the RAW data on the basis of the optimum generation conditions.

In the first embodiment described above, the controller part 37 generates the color image as the second output image from the RAW data from which the color image as the fist output image was generated. Accordingly, after picking up an image, the user can generate a color image as intended, without deteriorating the image quality after the image is picked up. The controller part 37 converts the attribute data to invalid data for an item of which generation condition does not match the attribute data. Therefore, it is prevented that the user sets an improper imaging condition by referring to the attribute data attached to the image. It is noted that in the first embodiment, a display image is displayed on the screen of the LCD 36 before the generation-condition setting operation is accepted. With this feature, the user can redo the setting of the generation condition on the basis of the display results of the display image. Further, it is noted that the RAW data is not stored in the removable memory 48, and an image is generated after the image is picked up. This fact enables the memory capacity of the removable memory 48 to be efficiency used.

Second Embodiment

An arrangement of a DSC as an image processing apparatus, which is a second embodiment of the present invention, is substantially the same as of the DSC 1 of the first embodiment (FIG. 2).

In the second embodiment, a memory area into which plural pieces of RAW data can be stored is allotted to the RAW buffer area 90. Accordingly, the user can generate a color image not only from the RAW data generated by the preceding image pickup operation but also from the RAW data generated by further preceding image pickup operations or still further ones, by the generation-condition setting operation after the image is picked up. It is suggested that a memory capacity of the RAW buffer area 90 is selected so as to store the RAW data as large an amount as possible, in consideration of the full capacity of the RAM 32, the first work buffer area 92 necessary for generating the color image, the second work buffer area 94, the frame memory area 96, the program area and the like.

Figure 9:
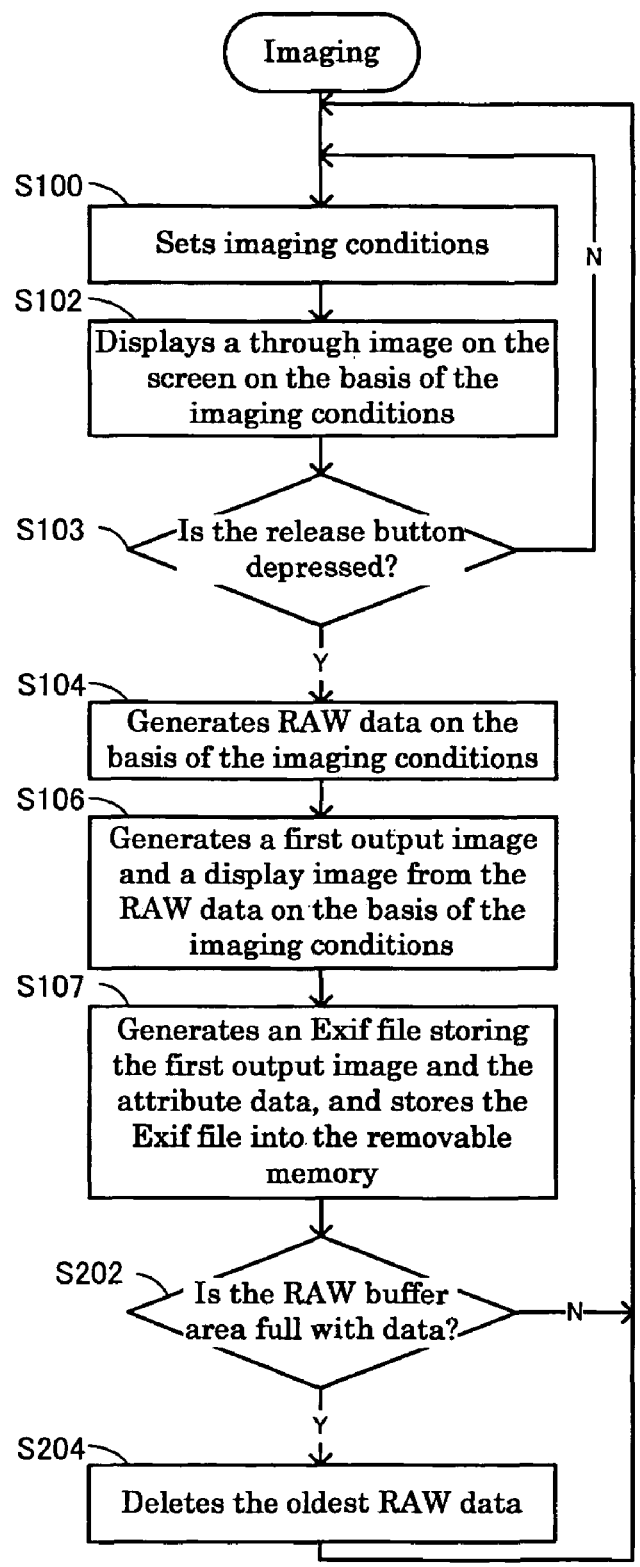
FIG. 9 is a flow chart according to a second embodiment of the present invention.
Figure 10:
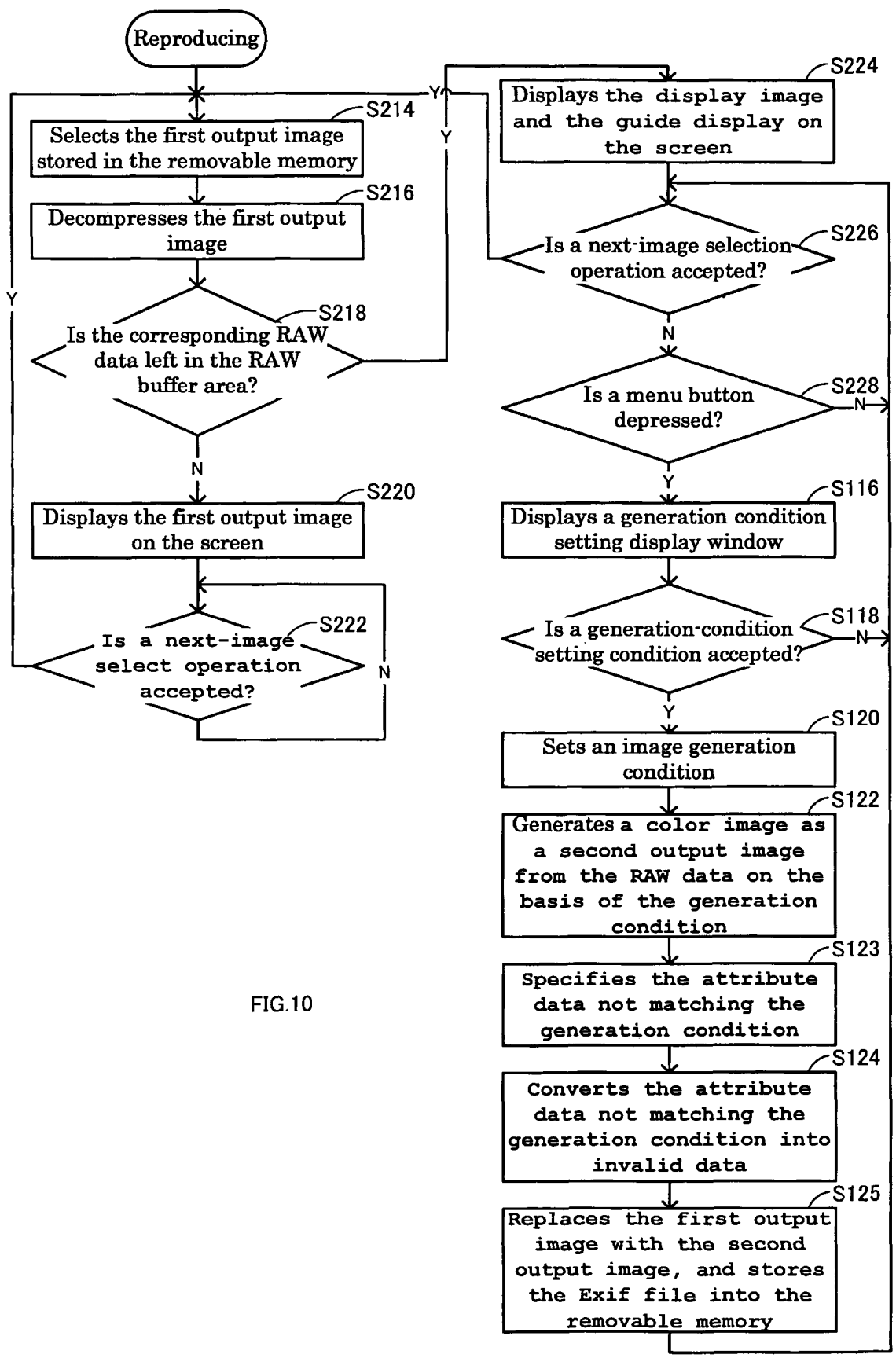
FIG. 10 is a flow chart according to a second embodiment of the present invention.

FIGS. 9 and 10 are flow charts showing image processing flows in the DSC 1 as the image processing apparatus which is the second embodiment of the invention.

A process of an image pickup mode shown in FIG. 9 is switched to and from a process of a reproducing mode shown in FIG. 10 by a mode switching operation.

(Image Pickup Mode)

When an Exif file is stored into the removable memory 48 as in the first embodiment, and the memory area of the RAW buffer area 90 is insufficient to store additional RAW data, the controller part 37 deletes the oldest RAW data from the RAW buffer area 90 (steps S202 and S204). The controller part 37 autonomously deletes the RAW data regardless of the user's will. The timing of deleting the RAW data is not necessarily set at this stage. The controller part 37 may delete the RAW data at such timing that as the result of the data deletion, the intervals of the consecutive image picking up operations are not increased.

(Reproducing Mode)

In a step S214, the controller part 37 selects the first output image stored in the removable memory 48. In this case, the fist output image is selected in the order of picking up images file names or the like.

In a step S216, the controller part 37 cooperates with the compression/decompression part 28 to decompress the selected first output image and to store the decompressed one into the RAM 32.

In a step S218, the controller part 37 checks if RAW data corresponding to the selected color image is stored in the RAW buffer area 90 of the RAM 32. The controller part 37 may associate the color image as the first output image with the RAW data in a manner that information for associating RAW data stored in the RAW buffer area 90 with the names of files storing the color images as the first output images is stored into the RAM 32.

When RAW data corresponding to the selected color image is not stored in the RAW buffer area 90 of the RAM 32, the controller part 37 cooperates with the resolution conversion part 26 to generate a display image from the color image, and cooperates with the graphic controller 34 to display a display image on the screen of the LCD 36 (step S220). At this time, the guide indication 110 shown in FIG. 6(A) is not displayed on the LCD 36.

When RAW data corresponding to the selected color image is stored in the RAW buffer area 90 of the RAM 32, the controller part 37 cooperates with the resolution conversion part 26 to generate a display image from the color image, and cooperates with the graphic controller 34 to display the display image and the guide indication 110 as shown in FIG. 6A on the screen of the LCD 36 (step S220).

When accepting a next-image select operation, the controller part 37 returns a process of a step S214 (steps S222 and S226). The next-image select operation is accepted, for example, when the user turns the jog dial 66.

The controller part 37 accepts an image-reproduction request operation in a state that the guide indication 110 is being displayed on the screen of the LCD 36, and in turn, advances to a process of a step S116. Then, a process similar to that in the first embodiment is executed (step S228). The image-reproduction request operation is accepted, for example, when the user pushes the menu button 58.

In the second embodiment thus far described, it is possible to generate the second output image from the RAW data on the basis of the generation conditions, even if it is not immediately after the image pickup.

The DSC 1 may store the second output image that is generated on the basis of the generation conditions into another file, which is different from the file storing the first output image.

While the exemplar case where the invention is applied to the DSC has been described, it will readily be understood that the invention may be applied to a digital video camera and a portable phone with a digital camera.

Third Embodiment

An arrangement of a DSC as an image processing apparatus, which is a third embodiment of the present invention, is substantially the same as of the DSC 1 of the first embodiment (FIG. 2). In the DSC 1 of the third embodiment, the controller part 37, the color processing part 24, the resolution conversion part 26, and the compression/decompression part 28 function as a correction unit.

In the DSC 1 constructed according to the third embodiment, an original image which was compressed and stored into the removable memory 48 in the previous image pickup operation can be retouched later on. In the embodiment, the original image, together with attribute data indicative of the imaging condition, etc., and thumbnail images, is stored in the JPEG format in an Exif file. The original image to be retouched may be an image picked up by another DSC, which is different from the DSC 1 of the third embodiment. The storage location of the original image, like the first output image in the first embodiment, is not limited to the removable memory 48. The first image may be stored in the flash memory 38, for example.

Figure 11:
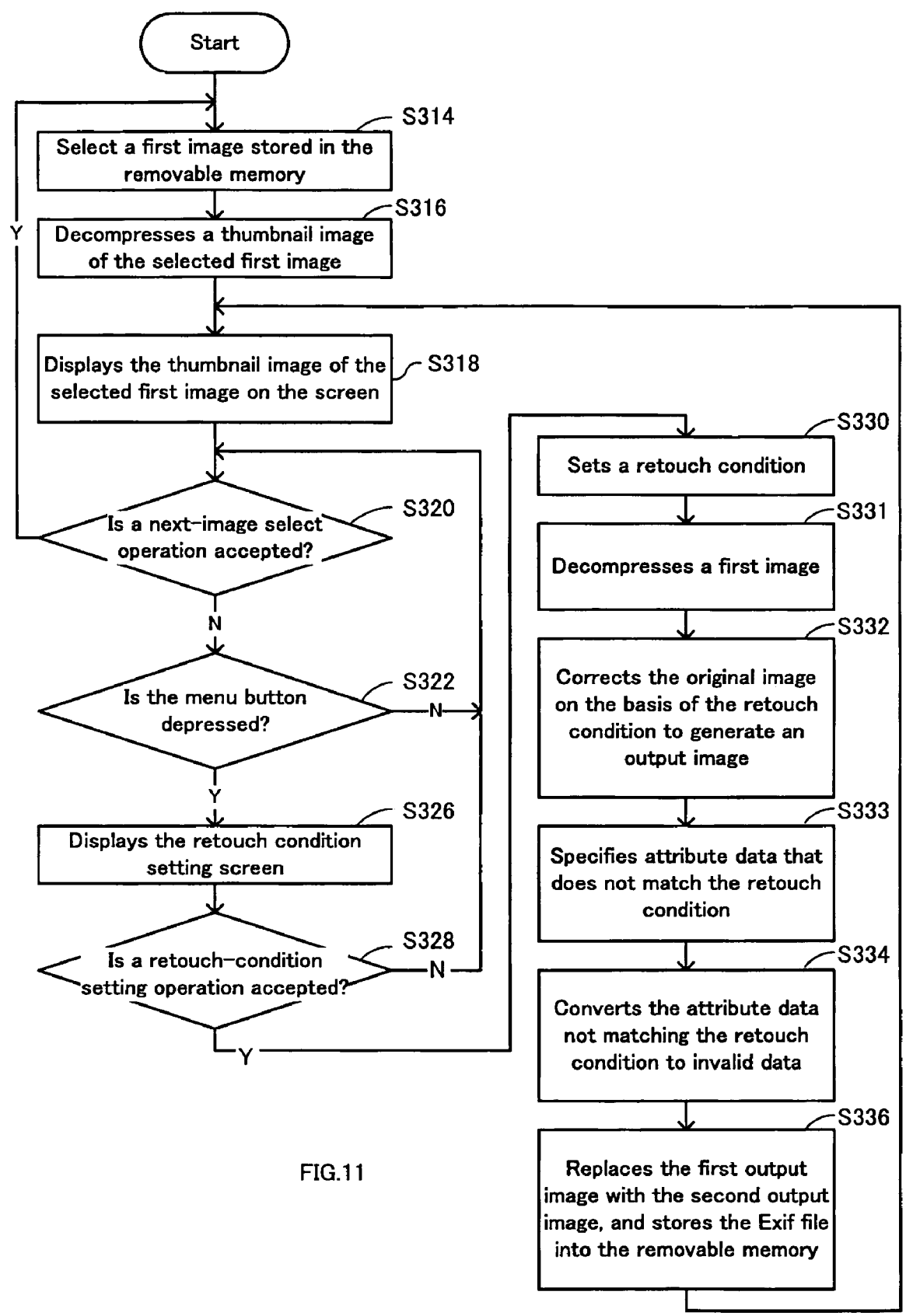
FIG. 11 is a flow chart according to a third embodiment of the present invention.

FIG. 11 is a flow chart showing a flow of an image process processing in the DSC 1 of the third embodiment. A process shown in FIG. 11 starts to run when the DSC 1 shifts its operation mode to a reproducing mode, and its execution is repeated till the reproducing mode of the DSC 1 is shifted from the reproducing mode to another operation mode, for example, an image pickup mode.

In a step S314, the controller part 37 selects an original image stored in the removable memory 48. An order to select the original image is an order of picking up images, an order of file names or the like. An Exif file storing the original image will be referred to as a "subject file".

In a step S316, the controller part 37 cooperates with the removal memory controller 44 and the compression/decompression part 28 to decompress a thumbnail image that is stored in the subject file, and store it into the RAM 32.

In a step S318, the controller part 37 cooperates with the graphic controller 34 to display a thumbnail image on the screen of the LCD 36.

In steps S320 and S322, the controller part 37 waits for a next-image select operation and an image correction request. The controller part 37 accepts the next-image selection operation, and returns to the process of the step S314. When accepting the retouch request, the controller part 37 advances to a process of a step S326. The retouch request is accepted when the menu button 58, for example, is depressed.

In the step S326, the controller part 37 displays a retouch condition setting display window on the screen of the LCD 36.

When a retouch condition setting operation is performed (step S328), the controller part 37 sets a retouch condition according to the retouch condition setting operation (step S330). If the retouch condition setting operation is not performed, the controller part 37 returns to the process of the step S320. The retouch condition is a condition for executing various processes, such as sharpness correction, brightness correction, contrast correction, white balance correction, color balance correction, scene mode correction, resolution conversion, and data compression.

In a step S331, the controller part 37 decompresses the original image as a main image in the subject file and stores it into the RAM 32, in cooperation with the compression/decompression part 28.

In a step S332, the controller part 37 retouches the original image on the basis of the retouch condition to generate an output image, in cooperation with the color processing part 24, the resolution conversion part 26 and the compression/decompression part 28.

In a step S333, the controller part 37 specifies attribute condition data that does not match the retouch condition. Specifically, the controller part 37 specifies the attribute data not matching the retouch condition by referring to a table (FIG. 7) describing relationships between the retouch condition and the attribute data not matching the retouch condition, as in the first embodiment.

In a step S334, the controller part 37 converts the attribute data not matching the retouch condition to invalid data, as in the first embodiment (FIG. 8).

In a step S336, the controller part 37 cooperates with the removal memory controller 44 to replace the original image with the output image, and converts the attribute data not matching the retouch condition to invalid data. Then, the controller part stores the subject file into the removable memory 48.

It is evident that the third embodiment may be applied to a personal computer (PC), a multi-function printer and the like, which can access a storage medium, such as a removable memory and a hard disc.

Fourth Embodiment

Figure 12:
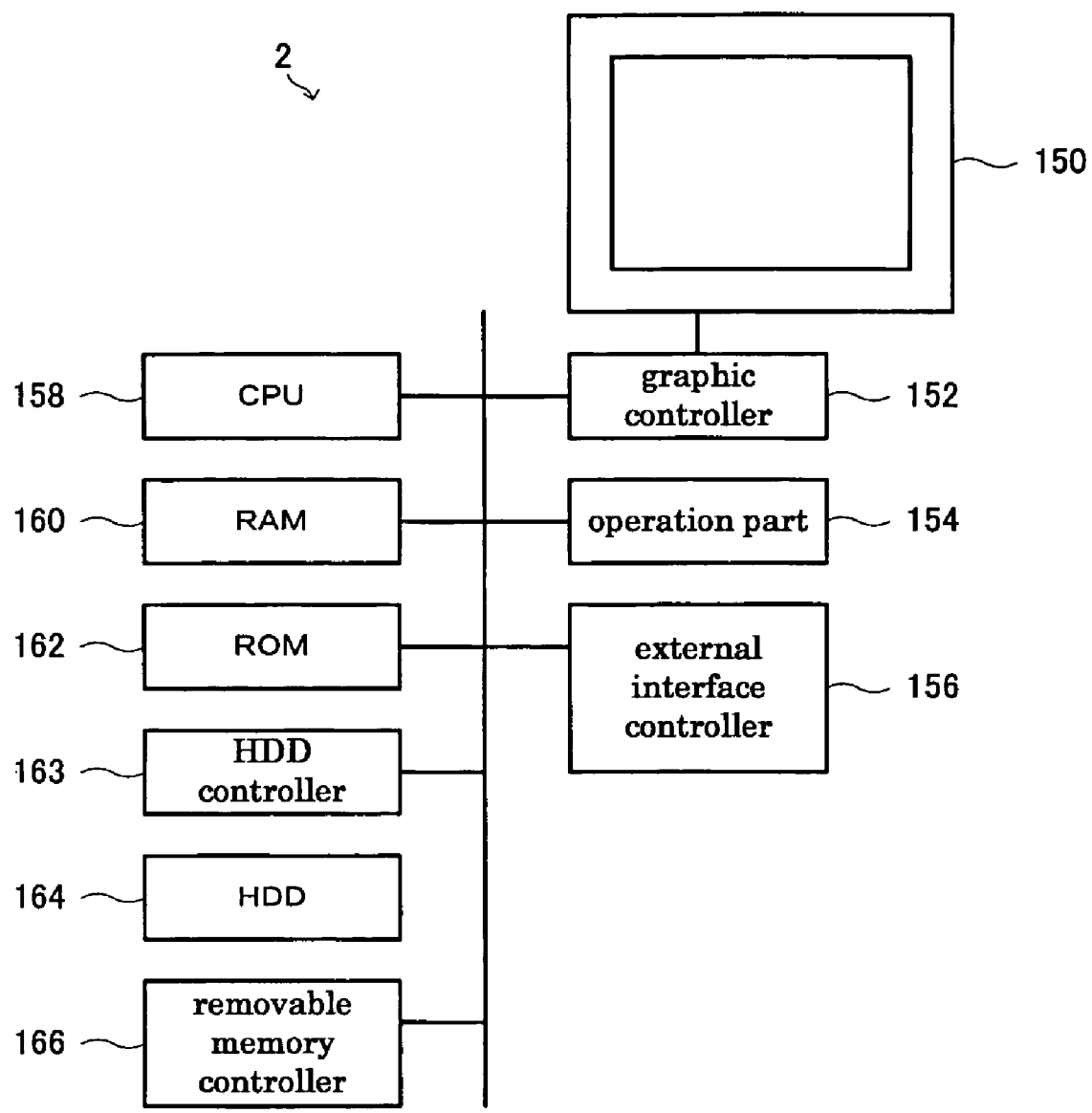
FIG. 12 is a block diagram according to a fourth embodiment of the present invention.

FIG. 12 is a block diagram showing a PC2 as an image processing apparatus which is a fourth embodiment of the present invention.

A CPU 158 causes the PC2 to serve as an image processing apparatus by executing an image processing program stored in a hard disc (HDD) 164. A hard disc controller 163 as an access unit controls data transfer between the HDD 164 and a RAM 160. A start program for starting up the PC2 is stored in a ROM 162. A graphic controller 152 as a display unit displays an image and text that are stored in the RAM 160 on the screen of the display 150. A removable memory controller 166 controls data transfer between a removable memory such as a card-type flash memory or a CD, and the RAM 160. An external interface controller 156 communicatively connects the PC2 to an external system. A communication between the PC2 and the external system may be a wire communication or a wireless communication. The removable memory controller 166 and the external interface controller 156 also serve as an access unit. An operation part 152 as a setting unit is an input/output unit, for example, a keyboard.

Figure 13:
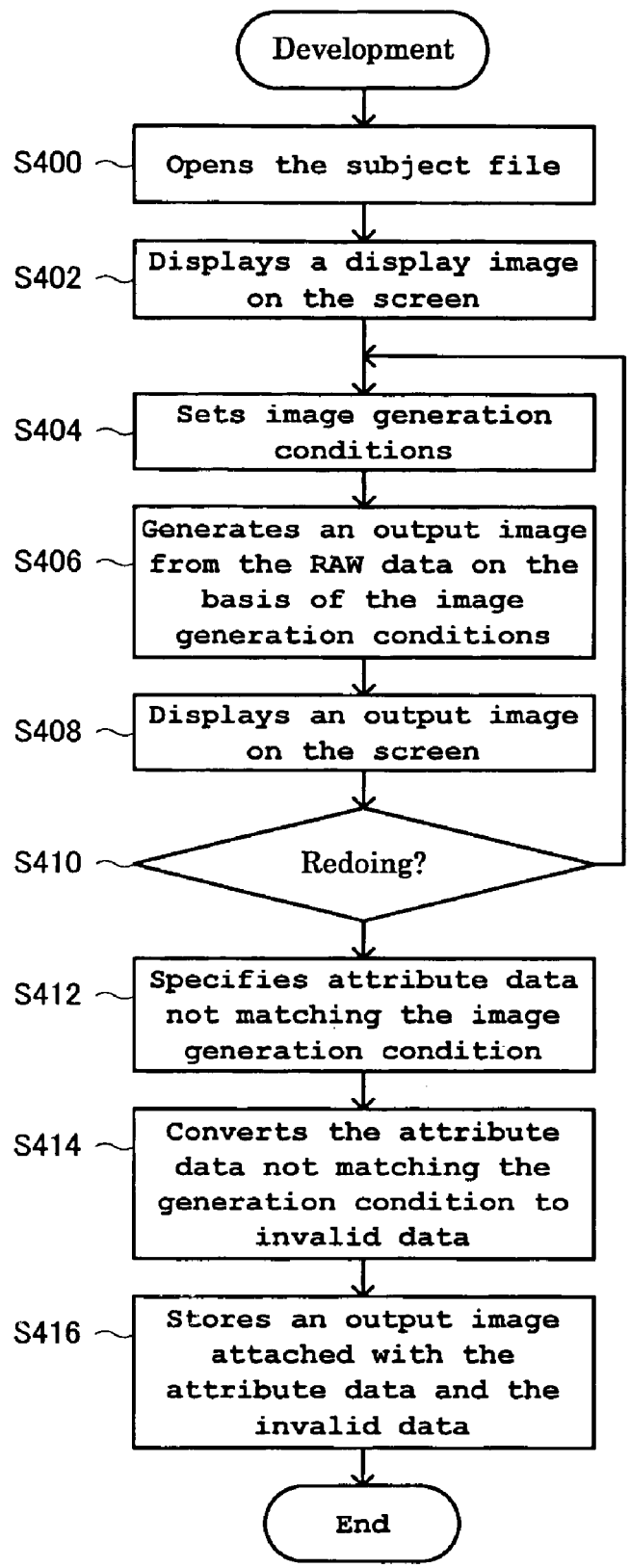
FIG. 13 is a flow chart according to the fourth embodiment of the present invention.

FIG. 13 is a flow chart showing a flow of an image processing by the PC2. A process shown in FIG. 13 starts, when a file storing RAW data is selected as a file to be developed.

In a step S400, the PC2 opens the subject file.

Specifically, the menu button 58 opens a file, which is stored in the HDD 164, the removable memory connected to the removable memory controller 166, the removable memory connected to the digital camera, or the like. The CPU stores an image of low resolution, which is generated from the RAW data, the attribute data, the RAW data and the like by the DSC or the like.

In a step S402, the PC2 displays a display image on the screen of the display 150. Specifically, the image of low resolution that is generated by an external system is compressed or decompressed in accordance with a display size by the CPU 158. The compressed or decompressed image is displayed on the screen of the display 150 by the graphic controller 152. Specifically, for example, the CPU 158 displays a display image 168 in a dialog window shown in FIG. 14. The display image may be generated by demosaic processing the RAW data of the subject file. When the display image is generated through the demosaic processing, the CPU 158 automatically sets the generation condition on the basis of the attribute data stored in the subject file, for example.

In a step S404, the PC2 sets generation conditions according to a user's setting request. Specifically, for example, when dropdown menus 170, 172 and 174 for setting the conditions of scene correction, exposure correction and white balance correction are operated, the CPU 158 sets generation conditions according to the values of those items selected by the dropdown menus 170, 172 and 174.

In a step S406, the PC2 generates an output image from the RAW data of the subject file on the basis of the generation conditions. Specifically, the CPU 158 executes the processes of pre-gain correction, white balance correction and optical black compensation, demosaic process, pseudo-color suppressing process, and the processes of exposure correction, resolution conversion and data compression.

For an item of which the generation condition is not corrected, the CPU 158 applies the generation condition that is univocally determined by the attribute data of the subject file to the pre-gain correction, white balance correction, optical black compensation process, demosaic process and the like. Specifically, for example, if the attribute data is "fine weather" in the item of the white balance, the CPU adjusts an RGB gain so that a value of a pixel representative of white, which was picked up under sunshine in a fine-weather day by the DSC, indicates white.

For an item that is not the item of which the generation condition is not corrected the CPU 158 applies the set generation condition to the white balance correction, the exposure correction, sharpness correction, the color balance correction, and the like. Specifically, for example, when "Landscape" is selected in the item of "scene", the CPU 158 applies the demosaic process or the like to the RAW data to generate an intermediate image, and applies a sharpening process to the intermediate image. For example, when "+1" is selected in the item of "exposure", the CPU 158 applies the demosaic process or the like to the RAW data to generate an intermediate image, and applies a tone curve correction for increasing luminosity to the intermediate image.

In a step S408, the PC2 displays an output image on the screen. Specifically, for example, the CPU 158 decompresses the output image, expands/or reduces the output image according to a display size to generate a display image, and updates the display image in the dialog window shown in FIG. 14 to a display image generated anew.

Figure 14:
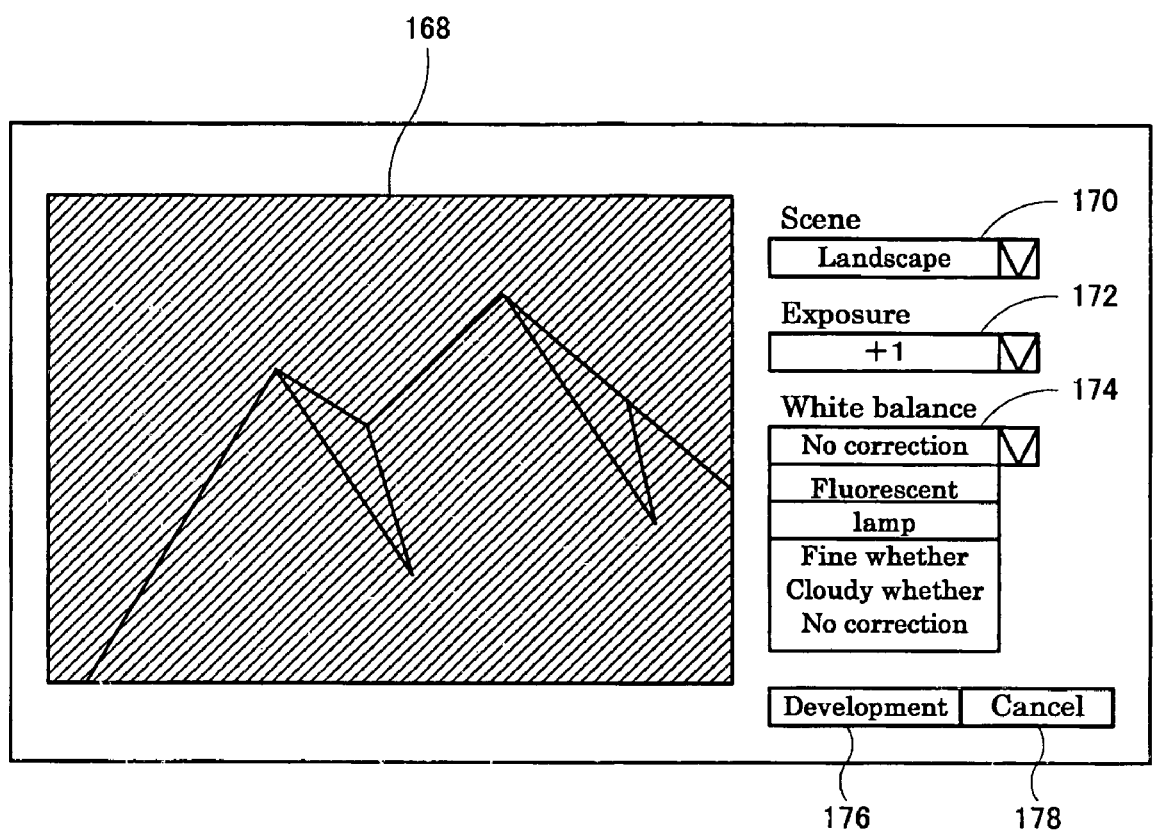
FIG. 14 is a model diagram according to the fourth embodiment of the present invention.

The processes of the steps S404, S406 and S408 are repeated every time the user requests the redoing (step S410). Specifically, for example, the processes of the steps S404, S406 and S408 are repeated every time the dropdown menus 170, 172 and 174 are operated, till a development button 176 shown in FIG. 14 is depressed.

In a step S412, the PC2 specifies attribute data not matching the generation condition. Specifically, for example, when "Landscape" is selected on the dropdown menu 170, and as a result, the generation condition for sharpening the image is set, the attribute data of the aperture does not match the generation condition. In another example, when "+1" is selected on the dropdown menu 172 for setting the exposure retouch condition is selected, and as a result, the generation condition to increase luminosity of the image is set, the attribute data of the shutter speed and the aperture do not match the generation condition. For example, when the attribute data of white balance is "Fine weather", and "fluorescent lamp" is selected on the dropdown menu 174 to set the white balance correction condition, the white-balance attribute data does not match the generation condition since the RGB gain is not adjusted in such a condition that a value of a pixel representative of white, which was picked up under sunshine in a fine-weather day by the DSC, indicates white. When a generation condition is set upon a setting request by the user, the CPU 158 specifies an item of which the generation condition does not match the attribute data, by referring to a table as in the first embodiment.

In a step S414, the PC2 converts the attribute data not matching the generation condition to invalid data. Specifically, for example, the CPU 158 converts the attribute data in the item of those stored in the RAM 160, which is specified in the step S412, to invalid data.

In a step S416, the PC2 stores an output image attached with the attribute data and the invalid data into the storage medium. Specifically, the CPU 158 stores a file in which the invalid data and the attribute data that are stored in the RAM 160 are stored in a header area, and the output image is stored in a data area, into a removable memory or the hard disc with aid of the removable memory controller 166 or the HDD 164.

In the fourth embodiment, when an image is generated from RAW data by another system, which is different from the system having generated the RAW data, the attribute data representative of imaging condition and the like may be attached to the attribute data. For an item of which generation condition does not match the attribute data, there is no chance that the user makes such a mistake that he/she sets improper imaging conditions by referring to the attribute data attached to the image, because the invalid data is attached to the image.

Combinations and sub-combinations of the embodiments described above, which are within the true scope and the intentions of the present invention, will readily occur to those persons skilled in the art.

The invention claimed is:

1. An image processing apparatus comprising:
   an access unit that accesses RAW data representing a tone level of only one channel for each pixel and that accesses attribute data attached to said RAW data;
   a setting unit that sets a generation condition to generate an image from said RAW data;
   a specifying unit that specifies whether or not the generation condition set by the setting unit matches the attribute data accessed by the access unit; and
   an image generation unit that generates an output image by developing said RAW data on the basis of said generation condition, that attaches said attribute data to said output image when the specifying unit specifies that said generation condition matches said attribute data, and that attaches invalid data to said output image when the specifying unit specifies that said generation condition does not match said attribute data,
   wherein the invalid data is a combination of the attribute data and data indicating that the attribute data is invalid.

2. An image processing apparatus according to claim 1, further comprising:
   a display unit for displaying a display image generated from said RAW data on a screen, said setting unit accepting a request input to said display unit to edit said display image after said display image is displayed on said screen and setting said generation condition in accordance with said input request.

3. An image processing apparatus according to claim 2, wherein when said access unit is able to edit said RAW data corresponding to said display image based on the input request, said display unit displays on said screen a menu indicating that said output image can be generated, based on said input request, from said RAW data corresponding to said display image.

4. An image processing apparatus according to claim 3, wherein said menu includes an object of operation, wherein said object of operation is used by a user for requesting a process of generating said output image, based on said input request to edit the display image, from said RAW data corresponding to said display image.

5. The image processing apparatus of claim 1, wherein the invalid data is in a form of
   m:x,
   wherein m is the attribute data and x is the data indicating that the attribute data is invalid.

6. An image processing apparatus comprising:
   an access unit that accesses an original image and that accesses attribute data attached to said original image;
   a setting unit that sets a retouch condition for retouching said original image;
   a specifying unit that specifies whether or not the retouch condition set by the setting unit matches the attribute data accessed by the access unit; and
   a retouching unit that retouches said original image on the basis of said retouch condition to generate an output image, that attaches said attribute data to said output image when the specifying unit specifies that said retouch condition matches said attribute data, and that attaches invalid data to said output image when the specifying unit specifies that said retouch condition does not match said attribute data,
   wherein the invalid data is a combination of the attribute data and data indicating that the attribute data is invalid.

7. The image processing apparatus of claim 6, wherein the invalid data is in a form of
   m:x,
   wherein m is the attribute data and x is the data indicating that the attribute data is invalid.

8. An image processing method comprising the steps of:
   accessing RAW data representing a tone level of one channel for each pixel and attribute data attached to said RAW data;
   setting a generation condition to generate an image from said RAW data;
   generating an output image from said RAW data on the basis of said generation condition; and
   attaching said attribute data to said output image when said generation condition matches said attribute data, and attaching invalid data to said output image when said generation condition does not match said attribute data,
   wherein the invalid data is a combination of the attribute data and data indicating that the attribute data is invalid.

9. The image processing method of claim 8, wherein the invalid data is in a form of
   m:x,
   wherein m is the attribute data and x is the data indicating that the attribute data is invalid.

10. An image processing method comprising the steps of:
    accessing, from a memory, an original image and attribute data attached to said original image;
    setting a retouch condition for correcting said original image; and
    correcting, using a processor, said original image on the basis of said retouch condition to generate an output image, attaching said attribute data to said output image when said retouch condition matches said attribute data, and attaching invalid data to said output image when said retouch condition does not match said attribute data,
    wherein the invalid data is a combination of the attribute data and data indicating that the attribute data is invalid.

11. The image processing method of claim 10, wherein the invalid data is in a form of
    m:x,
    wherein m is the attribute data and x is the data indicating that the attribute data is invalid.

* * * * *